United States Patent
Gardner

(10) Patent No.: US 7,292,643 B1
(45) Date of Patent: Nov. 6, 2007

(54) MIMO TCM WITH CONSTELLATION ROTATION AND COORDINATE SWAPPING

(75) Inventor: James Gardner, San Ramon, CA (US)

(73) Assignee: Qualcomm Corporation, San Diego, CA (US)

( * ) Notice: Subject to any disclaimer, the term of this patent is extended or adjusted under 35 U.S.C. 154(b) by 685 days.

(21) Appl. No.: 10/643,756

(22) Filed: Aug. 18, 2003

(51) Int. Cl.
*H04L 5/12* (2006.01)

(52) U.S. Cl. ............ 375/265; 704/242; 455/13.3; 714/792; 700/52

(58) Field of Classification Search ........ 375/130, 375/242, 265, 267, 299, 358, 347; 370/206, 370/335, 347, 342, 350

See application file for complete search history.

(56) References Cited

U.S. PATENT DOCUMENTS

| | | | |
|---|---|---|---|
| 4,891,823 A | * | 1/1990 | Cole .................. 375/242 |
| 6,377,631 B1 | * | 4/2002 | Raleigh ............... 375/299 |
| 2002/0126648 A1 | * | 9/2002 | Kuchi et al. ......... 371/347 |

* cited by examiner

*Primary Examiner*—David C. Payne
*Assistant Examiner*—Adolf DSouza
(74) *Attorney, Agent, or Firm*—Amin, Turocy & Calvin, LLP

(57) ABSTRACT

At the transmitting end of a multi-input multi-output communication system having at least two transmit antennas and $M_r$ receive antennas, each symbol of a symbol coset is first arranged so that distinct symbols have distinct real and imaginary components for some set of symbols. The real components of each pair of the arranged symbols form a complex number that is transmitted on the first one of the transmit antennas. The imaginary components of each pair of the arranged symbols form a second complex number that is transmitted on the second one of the transmit antennas. At the receiving end, a decoder receives vector r of the received complex numbers and a channel matrix H, and in response, computes a set of associated distance and label metrics for each of the transmit antennas. A Viterbi decoder receives the computed distance and label metrics and identifies the most likely transmitted coset.

19 Claims, 2 Drawing Sheets

MIMO TCM WITH CONSTELLATION ROTATION AND COORDINATE SWAPPING

BACKGROUND OF THE INVENTION

The present invention relates to digital communication, and more particularly to trellis coding used with multiple-input multiple-output communication systems.

Demand for wireless digital communication and data processing systems is on the rise. Inherent in most digital communication channels are errors between what was sent and what was detected. Such errors are often caused by electrical interference or thermal noise. Data transmission error rates depend, in part, on the medium that carries the data; i.e., the channel. Typical bit error rates for copper based data transmission systems are in the order of one error per $10^6$ bits. Optical fibers have typical bit error rates of $10^{-9}$ or less. Wireless transmission systems, on the other hand, may have error rates of $10^{-3}$ or higher.

The relatively high bit error rates of wireless transmission systems pose certain difficulties in encoding and decoding of data transmitted via such systems. A typical coding design models errors by an additive white Gaussian noise (AWGN) source added to the transmitted signal, partly because of its mathematical tractability and partly because of its application to a broad class of physical communication channels.

One approach to overcoming the effects of noise on data is to encode data at the transmitter, in a controlled manner, to include redundancy. The redundancy is subsequently used by the receiver to overcome the noise and interference introduced on the signal representing the data as the signal is being transmitted through the channel. For example, in a simple transmitter, k bits of information are coded by n-bit sequences, where n is greater than k, according to some coding scheme. The amount of redundancy introduced by the encoding of the data is determined by the ratio n/k, the inverse of which is referred to as the "code rate." Codewords representing the n-bit sequences can be generated by an encoder and delivered to a modulator that interfaces with the communication channel. The modulator might map each received sequence into a symbol. In M-ary signaling, the modulator maps each n-bit sequence into one of $M=2^n$ symbols. Data in other than binary form may be encoded, but typically the data is representable by a binary digit sequence.

To gain bandwidth efficiency and coding, Trellis Coded Modulation (TCM) has been developed and combines a multilevel phase modulation signaling set with a trellis coding scheme. TCM increases the minimum Euclidean distance between pairs of coded signals to reduce the loss from the expansion of signal set and to achieve coding gain with relatively simple codes. TCM is described in many places such as in Ungerboeck, "Trellis-Coded Modulation with Redundant Signal Sets Part I," IEEE Communications Magazine, Vol. 25, February 1987; and in Ungerboeck, "Trellis-Coded Modulation with Redundant Signal Sets Part II," IEEE Communications Magazine, Vol. 25, February 1987, both of which are incorporated herein by reference for all purposes.

At the receiving end of a transmission channel, the coded symbols are decoded to recover the transmitted data with a goal of minimizing the error rate. The Viterbi algorithm is an efficient maximum-likelihood sequence detection method for decoding convolutional and trellis coded symbols transmitted over AWGN channels. The Viterbi algorithm is described in a number of publications. See for example, Viterbi, "Error Bounds for Convolutional Codes and an Asymptotically Optimum Decoding Algorithm", IEEE Trans. on Information Theory, Vol. IT-13, April 1967; Forney, Jr., "Maximum-Likelihood Sequence Detection in the Presence of Intersymbol Interference" IEEE Trans. on Information Theory, Vol. IT-18, pp. 363-378, May 1972; and Forney, Jr., "The Viterbi Algorithm", IEEE Proceedings, Vol. 61, pp. 268-278, March 1973, all of which are incorporated herein by reference for all purposes.

In accordance with the Viterbi algorithm, for each received sample, a distance between that sample taken at time $t_i$ and all the trellis paths entering each state at time $t_j$ is calculated. In the Viterbi algorithm, the minimum Euclidean distance is selected as the optimum branch metric for decoding convolutional and trellis sequences transmitted in AWGN channels.

To increase data rate and operating range without increasing the bandwidth, multiple-input multiple-output (MIMO) systems have been developed. In a MIMO system, the transmitter includes multiple transmit antennas and the receiver includes multiple receive antennas. The transmitter splits the data to be transmitted into a number of streams (typically bit streams) or otherwise divides the transmission task and transmits the streams via the multiple transmit antennas. The receiver receives the transmitted streams via the multiple receive antennas.

FIG. 1 is a simplified block diagram of a prior art MIMO TCM encoder 10. TCM encoder 10 includes a serial-to-parallel converter 12, a convolutional encoder 14, a symbol mapper 16 and a serial-to-parallel converter 18. The MIMO system (not shown) of which MIMO TCM encoder 10 is a part, includes $M_t$ transmit antennas and $M_r$ receive antennas (not shown). The channel through which the data encoded by TCM encoder 10 is transmitted is characterized by the complex matrix H having the dimensions of $M_r \times M_t$. The channel is assumed to be an AWGN channel. Convolutional encoder 14 in conjunction with symbol mapper 16 performs the TCM encoding.

The labeling convention used herein for alphanumeric symbols represents scalar quantities as italic symbols, vectors as lowercase bold symbols, and matrices as uppercase bold symbols. Unless otherwise indicated, it is understood that each scalar quantity, vector component or matrix element can be a complex number.

Unencoded data bit streams arrive at serial-to-parallel converter 12 (hereinbelow referred to alternatively as converter 12). Out of every u+k bits that serially arrive at converter 12, u bits are delivered in parallel to symbol mapper 16 and k bits are delivered in parallel to convolutional encoder 14. The k-bits are encoded by convolutional encoder 14, which is assumed to have a code rate of k/n. Symbol mapper 16 uses the n encoded bits to select one of $2^n$ cosets of symbols, each having $2^u$ labels. Symbol mapper 16 then uses the u unencoded bits to select one of the $2^u$ labels from the selected coset. Each label so selected is represented by a complex number having a real and an imaginary component thus representing a constellation point in the complex plane. Serial-to-parallel converter 18 converts a serial symbol stream into $M_t$ parallel symbols, which are transmitted by the corresponding $M_t$ transmit antennas. Accordingly, each transmitted vector y has $M_t$ complex components. Each received vector r has the dimension of $M_r$ and is represented by the following expression:

$$r = Hy + v$$

where v is a vector representing noise and/or interference, and is assumed to have a spatial auto-covariance matrix, and H represents the channel responses between each transmit antenna and each receive antenna.

FIG. 2 is a simplified block diagram of a prior art MIMO TCM decoder 30 that is adapted to decode the data encoded by TCM encoder 10 after this data is transmitted. MIMO TCM decoder 30 includes a Logarithmic Maximum A Posteriori (Log-MAP) decoder 30, a Viterbi trellis decoder 34, a selector 36 and a parallel-to-serial converter 38. Log-MAP decoder 32 is supplied with the received vector r and the channel matrix H and, in response, generates an estimate for each of the transmitted symbols; this estimate is also referred to as a soft decision of the decoded symbol. In particular, Log-MAP decoder 32 finds the Euclidean distance between the received vector r and the nearest label in each coset for one antenna by searching over all other possible transmitted labels on the other $M_t-1$ antennas and does this for each antenna. For each coset j, for all possible labels in coset j and for each transmit antenna i, Log-MAP decoder 32 computes a distance metric d(i,j) and a corresponding label metric label(i, j), as shown below:

$$d(i, j) = \min_k (r - HX(k))^H \Lambda^{-1}(r - HX(k)) \quad (1)$$

$$\text{label}(i, j) = \operatorname*{argmin}_k (r - HX(k))^H \Lambda^{-1}(r - HX(k)) \quad (2)$$

In the above equations (1) and (2):
  H: is the channel estimate matrix,
  $\Lambda^{-1}$: is the inverse of the auto-covariance matrix of any of the antennas,
  X: is a $M_t$ by CL matrix of the possible transmitted symbol combinations on all the $M_t$ antennas, where $C=2^n$ is the number of cosets, and $L=2^u$ is the number of labels in each coset.
  X(k): represents all rows of matrix X that have an element of coset k in their ith column.

Metrics d(i, j) and label(i, j) so computed are supplied to Viterbi (trellis) decoder 34 and selector 36, respectively. Viterbi decoder 34 assigns the same distance d(i,j) to all edges in the trellis that generate an output with elements from coset j. The metrics d(i,j) and label(i,j) corresponding to each transmit antenna i are applied to associated transitions of the trellis. For instance, the distance and label metrics associated with transmit antenna 1 are applied to the following transitions in the trellis:

0, $M_t$, 2*$M_t$ . . .

Similarly, the distances and label metrics associated with transmit antenna 2 are applied to the following transitions in the trellis:

1, $M_t$+1, 2*$M_t$+1, . . .

Viterbi decoder 34 identifies the most likely k unencoded bits received by converter 12 (see FIG. 1) and the corresponding coset for each channel instance. The most likely coset returned from Viterbi decoder 34 is supplied to selector 36. Using the cosets received from Viterbi decoder 34, selector 36 identifies the most likely u unencoded bits and the corresponding labels for each channel instance. Parallel-to-serial converter 38 receives the bit streams associated with the cosets and labels in parallel—as identified by Viterbi decoder 34 and selector 36—and serializes these bit streams at its output terminals.

A number of well-known codes that have been devised to increase the reliability in data transmission require that errors caused by the channel to be statistically independent. This is the case for the AWGN channels. However, there are channels, such as those characterized by fading, that exhibit bursty error characteristics. Signal fading often causes the signal to fall below the noise level, thus resulting in a large number of errors. One conventional method for improving bursty error channels and fading is to interleave the codewords in such a way that the bursty channel is transformed into a channel having independent errors. In other words, interleaving the codewords before transmission and deinterleaving after reception causes burst of channel errors to be spread out in time so as to appear as random errors.

It is desired to have a technique for increasing the reliability with which data is transmitted through fading channels in a MIMO TCM system.

BRIEF SUMMARY OF THE INVENTION

In accordance with the present invention, in a multi-input multi-output communication system having $M_t$ transmit antennas and $M_r$ receive antennas, complex symbols are arranged so that distinct symbols have distinct real and imaginary components for some set of symbols, such as by being rotated by an angle. The real components of each associated pair of arranged symbols are then used to form an input symbol stream—representing a complex number—that is subsequently transmitted on, e.g., the first one of the transmit antennas. The imaginary components of each associated pair of arranged symbols are used to form a second input symbol stream—representing another complex number—that is subsequently transmitted on, e.g., the second one of the transmit antennas. Accordingly, one of the real and imaginary components of each symbol is swapped at the transmitting end. In some embodiments, each arranged symbol is interleaved before being swapped.

If the number of transmit antennas is equal to two, (i.e., $M_t=2$) the input bit stream $x_1$ associated with encoded symbols $Enc_1$ and $Enc_2$ and transmitted on, e.g., antenna 1 is as follows:

$x_1 = Re(Enc_1) + j*Re(Enc_2)$

Therefore, antenna 1 transmits a complex number that is formed by the real components of encoded symbols $Enc_1$ and $Enc_2$. Similarly, the input bit stream $x_2$ associated with encoded symbols $Enc_1$ and $Enc_2$ and transmitted on, e.g., antenna 2 is as follows:

$x_2 = Im(Enc_1) + j*Im(Enc_2)$

Therefore, antenna 2 transmits a complex number that is formed by the imaginary components of encoded symbols $Enc_1$ and $Enc_2$.

At the receiving end, a decoder receives a vector r of the transmitted bit streams—received on the $M_r$ receive antennas—and a channel matrix H that includes $M_t$ rows and $M_r$ columns. For each transmit antenna i (i is an integer varying from 1 to $M_t$), for all L possible labels in each coset j, a Log-MAP decoder at the receiving end computes an associated distance d(i, j) as shown below:

$$d(i, j) = \min_{k,p}(r - h_i x_j(k) - H_{n\neq i}X)^H \Lambda^{-1}(r - h_i x_j(k) - H_{n\neq i}X).$$

where $x_j(k)$ is the $k^{th}$ constellation point in coset j for antenna i, $h_i$ is the $i^{th}$ column of H, $H_{n\neq i}$ are the remaining columns of H, $\Lambda^{-1}$ is the inverse of the antenna auto-covariance matrix, X is a $(M_t-1)$ by CL matrix of the $p=2^{(u+n)*(Mt-1)}$ possible transmitted symbol combinations on the remaining antennas, $C=2^n$ is the number of cosets, and $L=2^u$ is the number of labels in each coset.

Next, using the channel estimates H and r, for each transmit antenna i, for all L possible labels in each coset j, the Log-MAP decoder computes an associated label label(i, j) as shown below:

$$\text{label}(i, j) = \underset{k}{\text{argmin}} (r - h_i x_j(k) - H_{n \neq i} X)^H \Lambda^{-1} (r - h_i x_j(k) - H_{n \neq i} X)$$

A Viterbi decoder receives the distances d(i,j) and labels label(i,j), and in response, identifies the most likely transmitted coset. Subsequently, a selector selects the transmitted label belonging to coset identified by the Viterbi decoder.

DETAILED DESCRIPTION OF THE INVENTION

Figure 1:
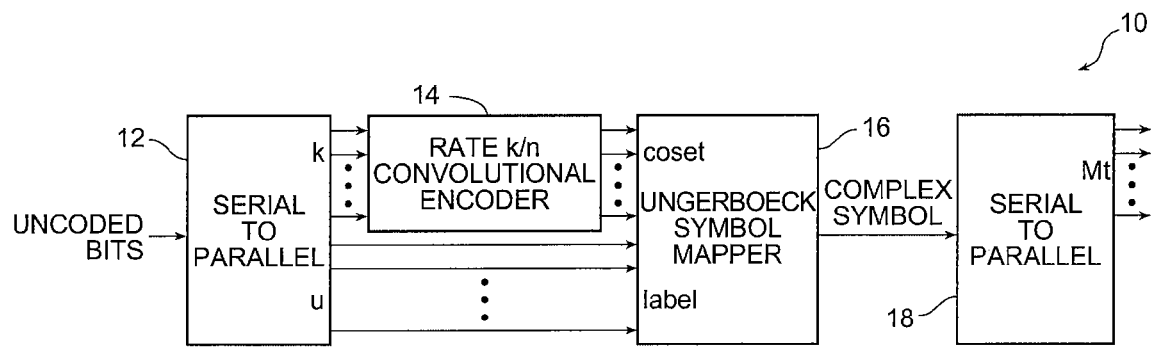
FIG. 1 is a simplified block diagram of a MIMO TCM encoder, as known in the prior art.
Figure 2:
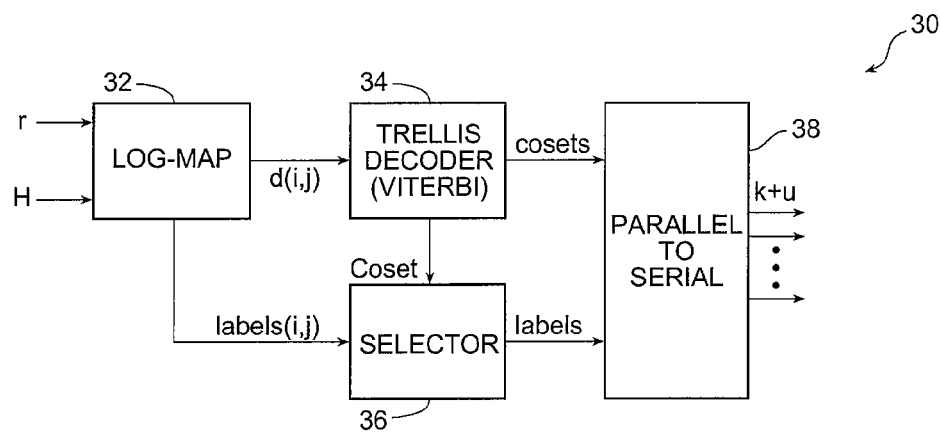
FIG. 2 is a simplified block diagram of a MIMO TCM decoder, as known in the prior art.
Figure 3:
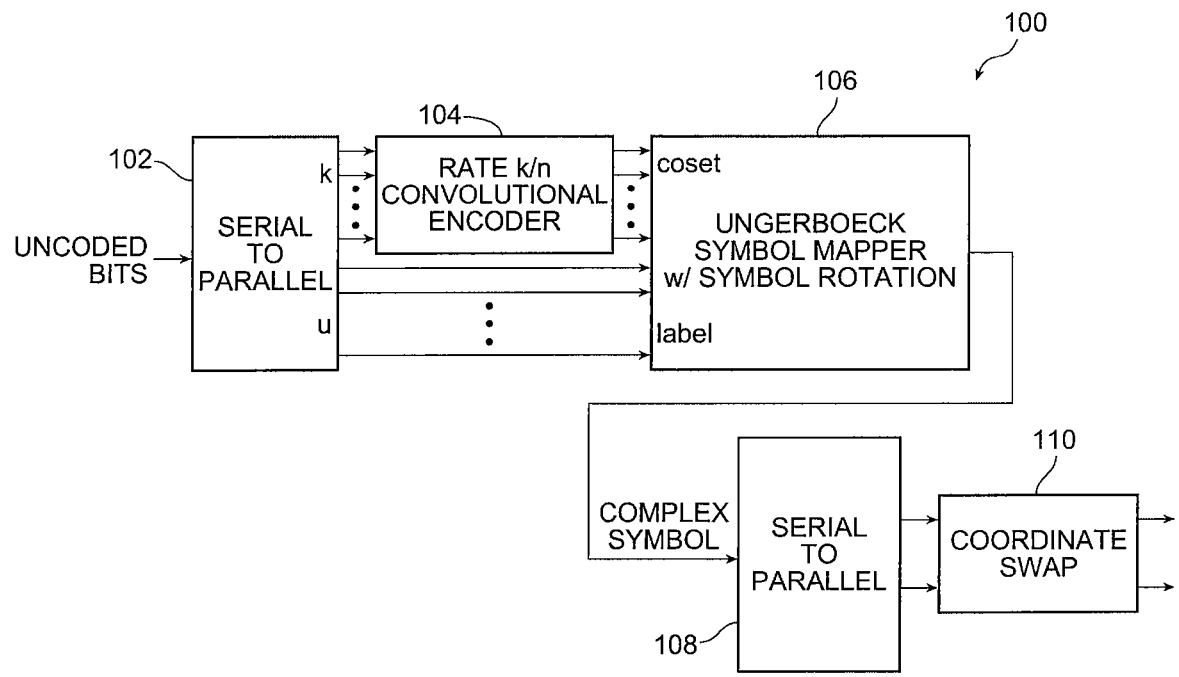
FIG. 3 is a simplified block diagram of a MIMO TCM encoder, in accordance with one embodiment of the present invention.

FIG. 3 is a simplified block diagram of a MIMO TCM encoder 100, in accordance with one embodiment of the present invention. MIMO TCM encoder 100 includes, in part, a serial-to-parallel converter 102, a convolutional encoder 104, a symbol mapper 106, a serial-to-parallel converter 108, and a coordinate swapper 110. Data supplied by coordinate swapper 110 is transmitted by at least two transmit antennas (not shown) and received by $M_r$ receive antennas (not shown). The channel through which the data encoded by TCM encoder 100 is transmitted is characterized by the complex matrix H having the dimensions of $M_r \times M_t$. In the following description of MIMO TCM encoder 100, it is assumed that $M_t$ is equal to two. It is understood, however, that the present invention applies to MIMO TCM encoders having more than two transmit antennas.

Unencoded data bit streams arrive at serial-to-parallel converter 102 (hereinbelow referred to alternatively as converter 12). Out of every u+k bits that serially arrive at converter 102, u bits are delivered in parallel to symbol mapper 106 and k bits are delivered in parallel to convolutional encoder 104. The bits do not need to be delivered exactly in parallel, but can be treated logically as parallel bits. The k bits are encoded by convolutional encoder 104 which has a code rate of k/n. Symbol mapper 106 uses the n encoded bits to select one of $2^n$ cosets of symbols, each having $2^u$ labels. Symbol mapper 106 then uses the u unencoded bits to select one of the $2^u$ labels from the selected coset. Each label so selected is a complex number having a real and an imaginary component. The serial bit streams associated with the real and imaginary component of each selected symbol are then rotated by symbol mapper 106 so that the real and imaginary components of the resulting symbols have distinct coordinates; standard constellation rotation techniques may be employed. Alternatively, any other technique for making the real and/or imaginary components more distinguishable might be used.

Constellation rotation (for clarity of description, the distinguishing of components is assumed to be constellation rotation in this portion of the description) allows every symbol in the constellation to be uniquely identified based on either its real or imaginary component. The rotated serial bit streams are then coordinate interleaved by symbol mapper 106. Coordinate interleaving results in the real and imaginary components of a symbol being transmitted by different antennas. Used in conjunction with constellation rotation, coordinate interleaving increases the diversity order of the system by providing additional redundancy. Specifically, if the signal from one transmitter is not received (due to channel fading), only one of the real and imaginary coordinates of a symbol is lost. The symbol may still be determined based on the other coordinate, which is received from a different transmitter that has different fading properties.

Serial-to-parallel converter 108 converts the rotated and interleaved serial bit streams associated with each selected symbol to $M_t$ parallel bit streams each having a real and an imaginary component. Each of the $M_t$ antennas ($M_t=2$), in accordance with the present invention, transmits a signal representing a complex number formed by either only the real components of the selected symbols or the imaginary components of the selected symbols. For example, assume that encoded symbols $Enc_1$ and $Enc_2$ are selected for transmission. Each of the encoded symbols $Enc_1$ and $Enc_2$ includes a real component and an imaginary component. In accordance with the present invention, the input bit stream to, e.g., antenna 1 is as follows:

$x_1 = Re(Enc_1) + j*Re(Enc_2)$

In other words, antenna 1 transmits a complex number that is formed by the real components of encoded symbols $Enc_1$ and $Enc_2$. Similarly, in accordance with the present invention, the input bit stream to, e.g., antenna 2 is as follows:

$x_2 = Im(Enc_1) + j*Im(Enc_2)$

Therefore, antenna 2 transmits a complex number that is formed by the imaginary components of encoded symbols $Enc_1$ and $Enc_2$.

Figure 4:
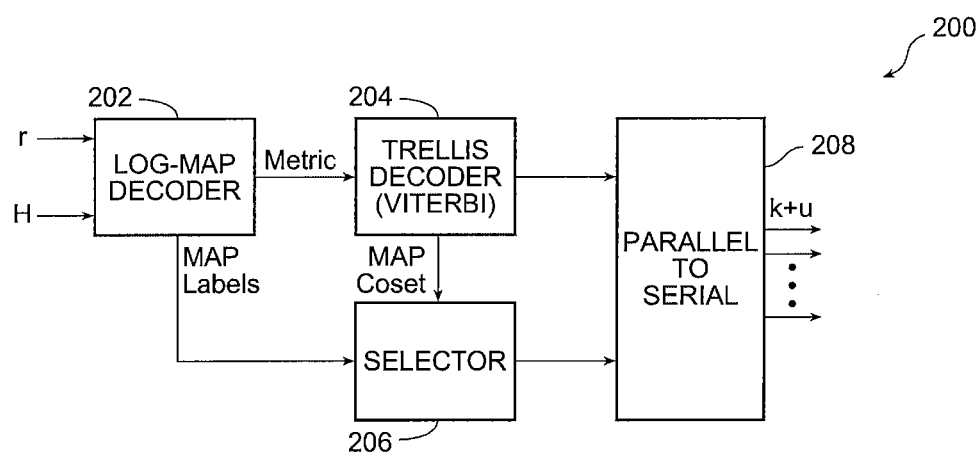
FIG. 4 is a simplified block diagram of a MIMO TCM decoder, in accordance with one embodiment of the present invention.

FIG. 4 is a simplified block diagram of a MIMO TCM decoder 200, in accordance with one embodiment of the present invention. MIMO TCM decoder 200 includes, in part, a Log-MAP decoder 202, a Viterbi decoder 204, a selector 206 and a parallel-to-serial converter 208. MIMO TCM decoder 200 is adapted to decode symbols encoded via an encoder, such as MIMO TCM encoder 100 shown in FIG. 3, and transmitted via a channel with a characteristic estimate matrix H.

In the following, it is assumed that encoded, rotated, interleaved and swapped symbol pair components forming associated bit streams are transmitted on $M_t=2$ transmit antennas and are received on $M_r$ receive antennas. Therefore, each transmitted symbol vector y has $M_t$ complex components. It is further assumed that each received vector symbol r has the dimension of $M_r$ and is represented by the following expression:

$r = Hy + v$ where v is the noise and/or interference vector which is assumed to have a spatial auto-covariance matrix.

Log-MAP decoder 202 receives the channel matrix H and vector r, and in response, supplies to Viterbi decoder 204 and selector 206 a distance metric (alternatively referred to hereinbelow as a distance) and a label metric (alternatively referred to hereinbelow as a label) associated with each transmitted symbol. For each transmit antenna, a set of associated distances and labels are computed for each $m^{th}$ channel instance given the channel estimates H(m) (alternatively referred to hereinbelow as H) and the received vector r(m) (alternatively referred to hereinbelow as r). A channel instance is associated with one of the $M_t$ transmit antennas and one of the $M_r$ receive antennas, so the $m^{th}$ channel instance is one of $M_t \times M_r$ channel instances.

The distance between the received vector r and the nearest label in each coset is determined for each antenna by searching over all other possible transmit symbols sets on the other $M_t-1$ antennas. In other words, for each transmit antenna i (i is an integer varying from 1 to $M_t$), for all L possible labels in each coset j, a distance d (i, j) is calculated as shown below:

$$d(i, j) = \min_{k,p}(r - h_i x_j(k) - H_{n \neq i} X)^H \Lambda^{-1}(r - h_i x_j(k) - H_{n \neq i} X).$$

where:

$x_j(k)$: is the $k^{th}$ point in coset j for antenna i $h_i$: is the $i^{th}$ column of H, $H_{n \neq 1}$: are the remaining columns of H, $\Lambda^{-1}$: is the inverse of the antenna auto-covariance matrix, X: is a ($M_t-1$) by CL matrix of the $p=2^{(u+n)*(Mt-1)}$ possible transmitted symbol combinations on the $M_t-1$ other antennas, where $C=2^n$ is the number of cosets, and $L=2^u$ is the number of labels in each coset. In other words, X includes all the possible transmitted symbols except those transmitted on the $i^{th}$ antenna.

Each $x_j(k)$ and each component of matrix X is rotated, coordinate interleaved and swapped as described above. Accordingly, Log-MAP decoder 202 is adapted to deinterleave, unrotate and unswap the data streams associated with each received symbol. Edges in the trellis that generate an output with elements from coset j, can be assigned the same distance d(i,j). The distances are computed for each of the other transmit antennas, i=2, ... $M_t$. Next, using the channel estimates H and r, the corresponding labels are computed for each edge in the trellis decoder, as shown below:

$$\text{label}(i, j) = \underset{k}{\text{argmin}}(r - h_i x_j(k) - H_{n \neq i} X)^H \Lambda^{-1}(r - h_i x_j(k) - H_{n \neq i} X)$$

The distances d(i,j) and labels label(i,j) corresponding to each transmit antenna are applied to associated transitions of the trellis. For instance, the distances and labels associated with the first transmit antenna (i.e., i=1) are applied to the following trellis transitions:

0, $M_t$, 2*$M_t$, ...

Similarly, the distances and labels associated with the second transmit antenna (i.e., i=2) are applied to the following trellis transitions:

1, $M_t$+1, 2*$M_t$+1, ...

Viterbi decoder 204 receives the distances d(i,j) and labels label(i,j) generated by Log-MAP 202. In response, Viterbi decoder 204 identifies the most likely transmitted coset. Using the cosets identified by Viterbi decoder 204 and the labels generated by search-efficient LOG-MAP 202, selector 204 selects the transmitted label belonging to coset identified by Viterbi decoder 204. Parallel-to-serial converter 208 receives the cosets and labels supplied by Viterbi decoder 204 and selector 206 in parallel. In response, parallel-to-serial converter 208 supplies these streams serially at its output terminals.

It is understood that the various blocks in encoder 100 and decoder 200, in accordance with the present invention, may be implemented by software code executed by a central processing unit, by dedicated hardware or by a combination of hardware and software.

The above embodiments of the present invention are illustrative and not limitative. The invention is not limited by the number of deployed transmit or receive antennas. The invention is not limited by the number of cosets or the number of labels within each coset. The invention is not limited by the number of bits used to select a coset or the number of bits used to select a label from a coset. Other additions, subtractions or modifications are obvious in view of the present invention and are intended to fall within the scope of the appended claims.

What is claimed is:

1. A method for transmitting data in a multi-input multi-output communications system having at least two transmit antennas and $M_r$ receive antennas, the data adapted to be transmitted via a channel having an associated channel matrix H with $M_r$ rows, wherein the number of columns of matrix H is the same as the number of transmit antennas, the method comprising:

associating each u+n bits of the data with a symbol selected from $2^u$ labels of $2^n$ cosets, wherein each symbol is represented by a constellation point on a complex plane;

arranging the constellation points on the complex plane such that at least some of the arranged constellation points have real components that are distinct from real components of other arranged constellation points and wherein the at least some of the arranged constellation points have imaginary components that are distinct from imaginary components of the other arranged constellation points;

transmitting only real components of each pair of associated symbols as an input stream on a first one of the at least two transmit antennas; and transmitting only imaginary components of each pair of associated symbols as a second input stream on a second one of the at least two transmit antennas.

2. The method of claim 1, wherein the input stream transmitted on the first transmit antenna is defined by:

$x_1 = Re(Enc_1) + j*Re(Enc_2)$ and wherein the second input stream transmitted on the second transmit antenna is defined by:

$x_2 = Im(Enc_1) + j*Im(Enc_2)$ wherein $Enc_1$ and $Enc_2$ represent a pair of arranged symbols, wherein $Re(Enc_1)$ represents the real component of symbol $Enc_1$, wherein $Re(Enc_2)$ represent the real component of symbol $Enc_2$, wherein $Im(Enc_1)$ represents the imaginary component of symbol $Enc_1$, wherein $Im(Enc_2)$ represent the imaginary component of symbol $Enc_2$, and wherein j represents $\sqrt{-1}$.

3. The method of claim 1, further comprising:

receiving a vector r of the transmitted symbols on the $M_r$ receive antennas, wherein the vector r has $M_r$ components; and forming a label metric and a distance metric associated with each of the at least two transmit antennas.

4. The method of claim 3, wherein for coset j, the label metric associated with transmit antenna i is defined by:

$$\text{label}(i, j) = \underset{k}{\text{argmin}}(r - h_i x_j(k) - H_{n \neq i} X)^H \Lambda^{-1}(r - h_i x_j(k) - H_{n \neq i} X)$$

wherein i represents one of the at least two transmit antennas, j represents one of the $2^n$ cosets, k represents one of the $2^u$ labels of coset j, $x_j(k)$ represents the value of the $k^{th}$ point in coset j, $h_i$ is the $i^{th}$ column of matrix H, $H_{n \neq i}$ is a matrix of the remaining columns of H, and $\Lambda^{-1}$ is an auto-covariance matrix of any of the at least two transmit antennas.

5. The method of claim 3, wherein for coset j, the distance metric associated with transmit antenna i is defined by:

$$d(i, j) = \underset{k,p}{\min}(r - h_i x_j(k) - H_{n \neq i} X)^H \Lambda^{-1}(r - h_i x_j(k) - H_{n \neq i} X).$$

wherein i represents one of the at least two transmit antennas, j represents one of the $2^n$ cosets, k represents one of the $2^u$ labels of coset j, $x_j(k)$ represents the value of the $k^{th}$ point in coset j, $h_i$ is the $i^{th}$ column of matrix H, and $H_{n \neq i}$ is a matrix of the remaining columns of H, $\Lambda^{-1}$ is an auto-covariance matrix of any of the at least two transmit antennas, and p represents a set of possible transmitted symbols.

6. The method of claim 3, further comprising:

supplying the distance metric and the label metric associated with each transmit antenna to a Viterbi decoder.

7. The method of claim 1, further comprising:

interleaving each symbol prior to the transmitting steps.

8. The method of claim 1 wherein said arranging includes rotating coordinates of the constellation points.

9. An apparatus adapted to transmit data in a multi-input multi-output communications system having at least two transmit antennas and $M_r$ receive antennas, the apparatus transmitting data via a channel having an associated matrix H with $M_r$ rows, wherein the number of columns of matrix H is the same as the number of transmit antennas, the apparatus comprising:

a first module adapted to associate each u+n bits of the data with a symbol selected from $2^u$ labels of $2^n$ cosets, wherein each symbol is represented by a constellation point on a complex plane;

a second module adapted to arrange the constellation points on the complex plane such that at least some of the arranged constellation points have real components that are distinct from real components of other arranged constellation points and wherein the at least some of the rearranged constellation points have imaginary components that are distinct from imaginary components of the other arranged constellation points;

a third module adapted to transmit only the real components of each pair of the arranged symbols as an input stream on a first one of the at least two transmit antennas; and a fourth module adapted to transmit only the imaginary components of each pair of the arranged symbols as a second input stream on a second one of the at least two transmit antennas.

10. The apparatus of claim 9, wherein the input stream transmitted on the first transmit antenna is defined by:

$$x_1 = Re(Enc_1) + j*Re(Enc_2)$$

and wherein the second input stream transmitted on the second transmit antenna is defined by:

$$x_2 = Im(Enc_1) + j*Im(Enc_2)$$

wherein $Enc_1$ and $Enc_2$ represent a pair of arranged symbols, wherein $Re(Enc_1)$ represents the real component of symbol $Enc_1$, wherein $Re(Enc_2)$ represent the real component of symbol $Enc_2$, wherein $Im(Enc_1)$ represents the imaginary component of symbol $Enc_1$, wherein $Im(Enc_2)$ represent the imaginary component of symbol $Enc_2$, and wherein j represents $\sqrt{-1}$.

11. The apparatus of claim 9 further comprising:

a fifth module adapted to receive a vector r of the transmitted symbols on the $M_r$ receive antennas, wherein the vector r has $M_r$ components; and a sixth module adapted to form a label metric and a distance metric associated with each of the at least two transmit antennas.

12. The apparatus of claim 11, wherein for coset j, the label metric associated with transmit antenna i is defined by:

$$\text{label}(i, j) = \underset{k}{\text{argmin}}(r - h_i x_j(k) - H_{n \neq i} X)^H \Lambda^{-1}(r - h_i x_j(k) - H_{n \neq i} X)$$

wherein i represents one of the at least two transmit antennas, j represents one of the $2^n$ cosets, k represents one of the $2^u$ labels of coset j, $x_j(k)$ represents the value of the $k^{th}$ point in coset j, $h_i$ is the $i^{th}$ column of matrix H, $H_{n \neq i}$ is a matrix of the remaining columns of H, and $\Lambda^{-1}$ is an auto-covariance matrix of any of the at least two transmit antennas.

13. The apparatus of claim 11, wherein for coset j, the distance metric associated with transmit antenna is defined by:

$$d(i, j) = \underset{k,p}{\min}(r - h_i x_j(k) - H_{n \neq i} X)^H \Lambda^{-1}(r - h_i x_j(k) - H_{n \neq i} X).$$

wherein i represents one of the at least two transmit antennas, j represents one of the $2^n$ cosets, k represents one of the $2^u$ labels of coset j, $x_j(k)$ represents the value of the $k^{th}$ point in coset j, $h_i$ is the $i^{th}$ column of matrix H, $H_{n \neq i}$, is a matrix of the remaining columns of H, $\Lambda^{-1}$ is an auto-covariance matrix of any of the at least two transmit antennas, and p represents a set of possible transmitted symbols.

14. The apparatus of claim 11, wherein said apparatus is adapted to supply the distance metric and the label metric associated with each transmit antenna to a Viterbi decoder.

15. The apparatus of claim 11, wherein each of the first, second, third, fourth, fifth and sixth modules is a software module.

16. The apparatus of claim 11, wherein each of the first, second, third, fourth, fifth and sixth modules is a hardware module.

17. The apparatus claim 11, wherein each of the first, second, third, fourth, fifth and sixth modules includes both software and hardware modules.

18. The apparatus claim 9 further comprising:
a seventh module adapted to interleave each of the arranged symbols.

19. The apparatus claim 9 wherein said second module is further adapted to rotate coordinates of the constellation points.

* * * * *